Feb. 22, 1949.　　　　J. W. PEEPLES　　　　2,462,546
ELECTRICAL CONTROL SYSTEM AND METHOD OF OPERATION
Filed Sept. 19, 1945　　　　3 Sheets-Sheet 1

Inventor,
JAMES W. PEEPLES

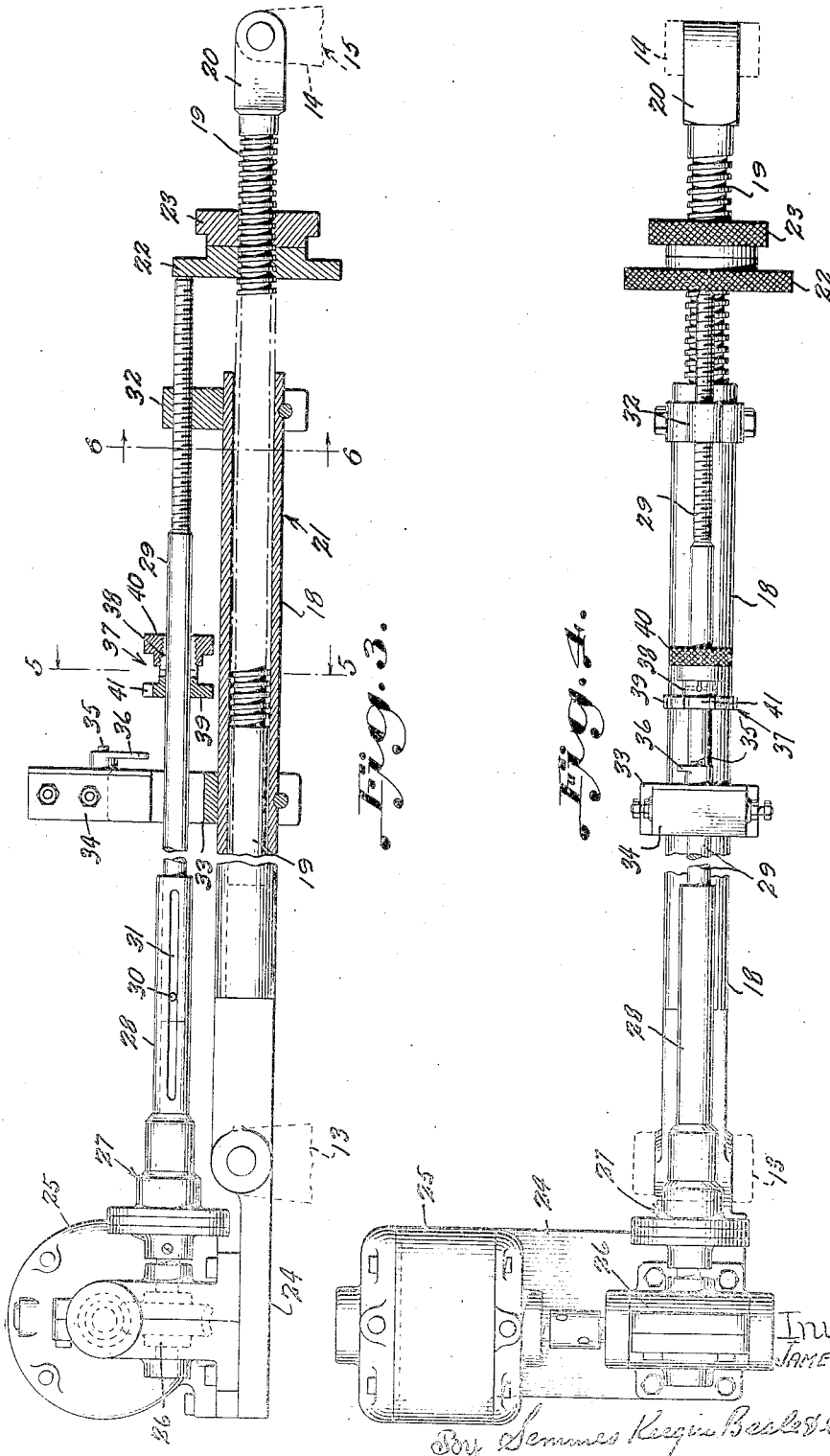

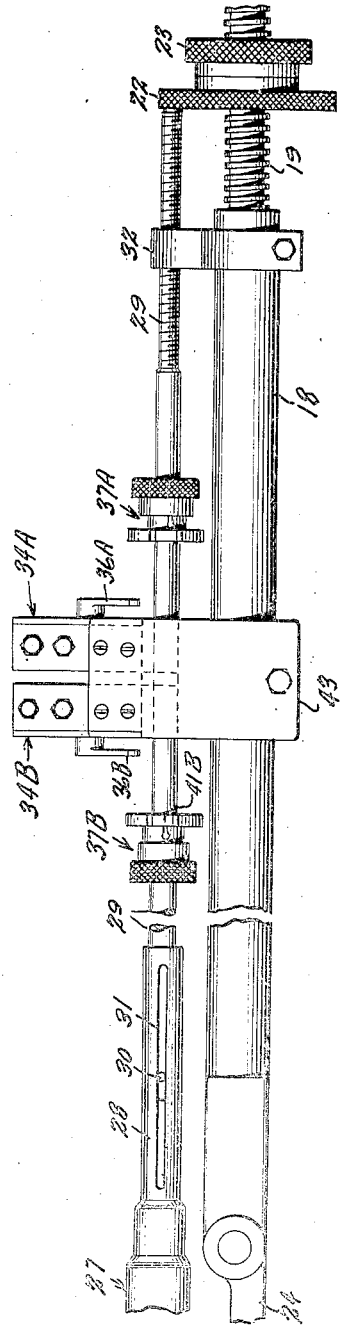
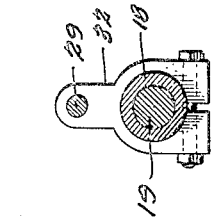
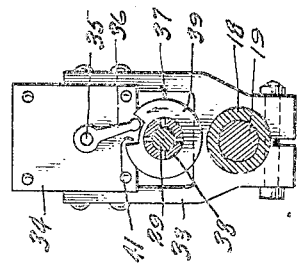

Patented Feb. 22, 1949

2,462,546

UNITED STATES PATENT OFFICE 2,462,546

ELECTRICAL CONTROL SYSTEM AND METHOD OF OPERATION

James W. Peeples, Dadeville, Ala.

Application September 19, 1945, Serial No. 617,257

9 Claims. (Cl. 290—4)

The present invention relates to control systems and more particularly to a system for controlling the operation of prime movers for parallel operated, electric generating machines.

More specifically, the invention relates to an interlocked electrical relay system, which may be responsive to signals or electrical impulses sent out from a central point in a tie line power supply system for automatically transferring the control of a regulator from one to another of the parallel operated generating machines in the power stations, and to an easily adjusted raise-lower governor control or load adjusting unit under the control of such relay system.

While the system embraced in this invention is particularly adapted for controlling power stations in tie line systems, its use is not so limited as it will be apparent from the following description that it may be effectively and efficiently used for transferring control from one to another of parallel operated, electric generating machines in a single multi-generator power plant.

It has been demonstrated that substantial economies can be obtained in the operation of a multi-generator power plant or plants by transferring the regulator control from one to another of the generators when the load carried by the first reaches a given maximum or minimum limit. If the means for transferring the regulator control is capable of progressive shifting among all of the machines in the plant, regulation over a maximum range of load demand fluctuations, such as encountered in power pool, lend-borrow transactions, may be readily obtained.

I have found that still further savings in the cost of operating a power plant and high machine efficiency may be obtained by transferring the control from one to another machine in the plant sequentially in a manner whereby one generator is brought up to a full predetermined load capacity before another generator is cut into the line by means of the transfer control. For example, in a plan operating with three generating machines of 35,000 kw. each and a load demand during a period of operation of only 30,000 kw. is required, a single machine carries the full load instead of dividing the load between the three machines.

Various control transfer schemes have been proposed operating under manual control of the operator, operating semi-automatically and automatically. The automatic and semi-automatic schemes heretofore proposed have required very complicated control apparatus and moreover the fully automatic systems have not operated entirely satisfactorily because of dead spots inherent in the control system as transfer is made from one to another of the machines.

It is therefore one of the objects of this invention to provide a simple but effective control transfer system for automatically effecting sequential transfer of the regulator control for the machines in a multi-generator power plant.

Another object of the invention is to provide a system of control transfer of the above character which may be automatically responsive to "raise-lower" signals from a central point or dispatcher's station in a tie line power system.

Another object of the invention is to provide a control transfer system of the above character which includes a system of interlocked electrical relays which may be responsive to "raise-lower" impulses, the relay system being arranged to control the operation of governor control units, of novel design, incorporated as a part of governor controlled prime movers of the generators, in a multi-machine power plant.

A further object of the invention is to provide a motor operated governor control unit for a generator prime mover which is quickly and accurately responsive to "raise-lower" requirements for the generator and which is fully and easily adjustable for predetermining both maximum and minimum loads to be carried by the generator.

With these and other important objects and advantages in view, which will become more apparent during the course of the following description, the invention consists in the parts and combinations hereinafter set forth with the understanding that the necessary parts comprising the combinations may be varied by those skilled in the art without departing from the spirit of the invention or exceeding the scope of the appended claims.

In order to make the invention more clearly understood, a preferred embodiment thereof has been illustrated in the accompanying drawings in which:

Figure 3 is an elevational view, partly in transverse section, of the governor control unit such as shown in Figure 2, and used on the first machine in a parallel operated multi-generator plant.

Figure 4 is a plan view of the unit shown in Figure 3.

Figure 5 is a cross sectional view taken along the line 5—5 of Figure 3 looking in the direction of the arrows.

Figure 6 is a cross sectional view taken along the line 6—6 of Figure 3 looking in the direction of the arrows.

Figure 7 is a fragmental elevational view of a governor limit switch control unit similar to that shown in Figure 3 but of the type used on intermediate machines in a aprallel operated line of generators.

Figure 2:
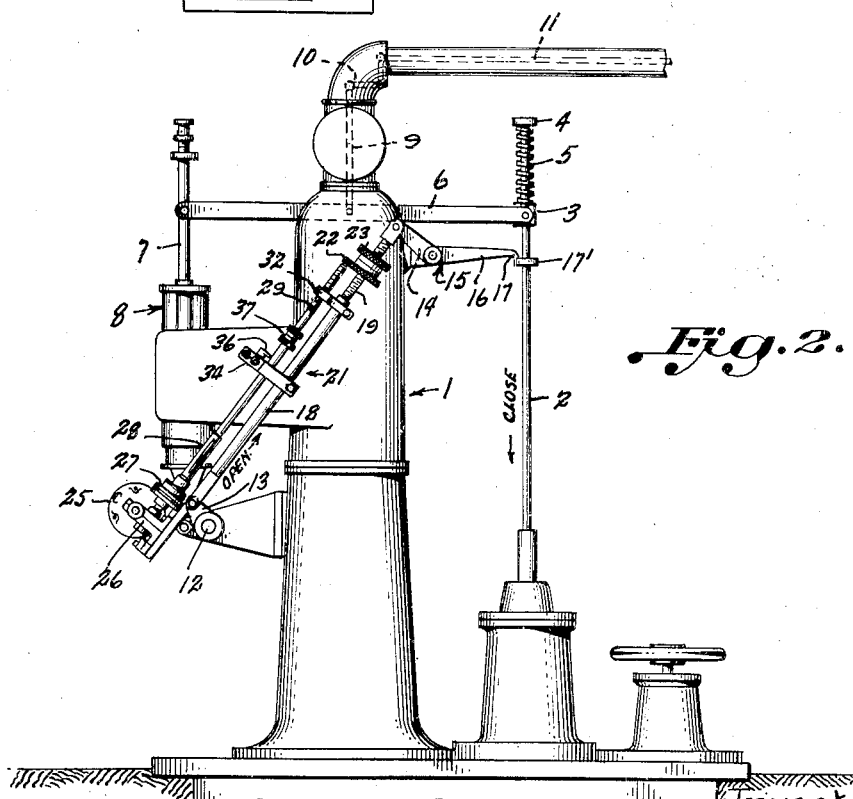
Figure 2 is an elevational view of a governor for a hydraulically operated prime mover for an electric generator and incorporating a governor control unit constructed in accordance with this invention.

Referring first to Figure 2, there is illustrated a conventional governor unit 1 for actuating the pilot or regulating valve for controlling the servomotor operating the gate of a hydraulic turbine. The pilot valve itself is not shown but is operated by a stem 2 about which is a collar 3. Between the collar 3 and a flange 4 at the uper end of the stem is a compression spring 5. The collar 3 is pivotally connected to one end of a floating lever 6, the opposite end of which is anchored to the piston rod 7 of a dash pot arrangement 8. The lever has a floating pivotal connection, intermediate its length, with a link 9 and through this link, a bell crank 10 and a second link 11, with the fly ball of the turbine (not shown).

In the conventional governor, a rocker shaft 12 is connected through appropriate linkage to the main valve or gate, controlling flow of the operating fluid to the turbine to rotate the shaft 12 proportionately with gate movement. This shaft carries a crank arm 13 which is connected through a longitudinally adjustable link or rod to one arm 14 of a bell crank 15, the opposite arm 16 of which terminates in a control finger 17 which is adapted to engage a flange or abutment 17' on the pilot valve stem 2. This arrangement is usually called the governor limit switch.

The governor functions in the usual manner to control the speed of the turbine by controlling the opening and closing of the turbine gate accomplished by the connections from the governor fly ball to the floating lever 6 and the stem 2 of the regulating or pilot valve, while the relative extent of the open or closed positions of the turbine gate are adjusted by means of the effective length of the limit switch rod. Both of these functions and operations are well known and further description is not thought necessary at this point. While this invention is shown and described in connection with a hydraulic prime mover, it is equally adaptable to other governor controlled machines.

Advantage is made of this regulation of the governor limit switch as a preferred means for varying the speed of the prime mover and as a consequence the output of the generator driven thereby, in accordance with this invention, by the provision of a novel governor control unit now to be described, for automatically varying the effective length of the link connecting the crank arm 13 and the control finger bell crank 15, and for actuating an electrical transfer from the governor control of one machine to that of another. It must be understood however that controlling the machines by regulating the governor limit switch as illustrated is only a preferred means for accomplishing the desired result and that controlling or regulating the operations of the machines at other points and by other means will be readily apparent to those skilled in the power plant operation, and may be made by the system of electrical control transfer embraced in the invention.

The means referred to by which I prefer to adjust the effective length of the limit switch link are best shown in Figures 3 and 4 and comprise a tube 18 which has a pivotal connection adjacent one end thereof with the crank arm 13. Slidably inserted in the opposite end of the tube 18 and projecting from the end thereof is a rod 19 which is threaded over substantially its length. The rod 19 does not have a threaded connection with the tube and the threads are preferably cut square to provide a close sliding engagement with the inner wall of the tube. The projecting end of the rod 19 is formed into a bifurcated yoke 20 which is pivotally connected with the arm 14 of the bell crank 15. This structure provides a telescopic link 21 connecting the crank arm 13 with the bell crank 15.

Threaded on the rod 19 for longitudinal adjustment thereon is a flanged collar 22 which is preferably backed by a flanged lock nut 23. The flanges of the collar and lock nut may each be knurled for easy manipulation.

Extending from the rear end of the tube 18 is a pad or shelf 24 upon which is mounted a small electric reversing motor 25 and a reduction gear 26 operatively connected therewith. The reduction gear 26 is adapted to rotate, preferably through a friction clutch coupling element designated generally as 27, a tube or sleeve member 28. This sleeve carries one end of a rod 29 which rotates with the sleeve and is capable of longitudinal movement with respect thereto through the medium of a pin or key member 30, affixed to the rod and riding in a longitudinal slot 31 in the sleeve. The rod 29 extends from the sleeve, parallel with the tube 18 and has its free end screw-threaded and threaded through a nut member 32 rigidly secured to the tube 18 adjacent the open end thereof. The end of the rod 29 projecting through the nut 32 is adapted to engage the flange of the collar 22. From the above it will be seen that rotation of the rod 29 by the motor 25 and reduction gear 26 will effect a relative longitudinal movement with respect to the tube 18 and by virtue of the engagement of the rod 29 with the collar 22, determine the effective length of the combined tube 18 and rod 19 or in other words the effective length of the link 21 connecting the crank arm 13 and bell crank 15.

Rigidly secured to the tube 18 is a bracket 33 which is bifurcated and straddles the rod 29. Secured in the bifurcation of the bracket 33 is a single pole-double throw electric switch unit 34 which has a rotatable switch actuating shaft 35 carrying an operating arm 36 extending substantially in the direction of the rod 29. Details of the construction of this switch are not shown but it is preferably of the snap variety, the contact closing arm or pole of which substantially simultaneously opens and closes respectively a pair of opposed contacts.

The switch 34 is adapted to be actuated upon a predetermined extension or contraction of the link 21 within very close limits. To this end, a switch actuating element 37, adjustably carried by the rod 29, is provided to move in the path of the switch arm 36. This actuating element comprises a collar 38 having a split shank fitting over the rod 29, and an external flange 39. The shank 38 is externally tapered and threaded and provided with a correspondingly tapered thread, knurled nut 40 which, when drawn up on the shank of the collar 37, constricts the shank tightly about the rod. The construction however permits the collar to be easily adjusted on the rod—both axially and rotationally—toward and away from the switch arm 36.

The flange 39 of the switch actuator, as best seen in Figure 5, is provided with a peripheral notch 41 having substantially radial side walls adapted to engage and move the switch arm from one side to the other when the flange 39 is in the path of movement of the arm and is rotated relative to the arm by the rod 29. The notch 41 has a depth sufficient to clear the end of the switch arm and a width such that when one side wall of the notch has moved the switch arm from one side to the other the arm will just clear the opposite side of the notch. From the above it will be seen that the switch will be actuated within extremely close limits of telescopic movement of the link 21, as a partial revolution of the switch actuator 37 is equivalent to only a very small fraction of an inch telescopic extension or contraction of the link 21.

With the parts of the governor control unit as just described and the motor 25 operating in a forward direction, for example, to rotate the rod 29 in a direction to move its threaded end away from the flanged collar 22, the effective length of the link 21 will be shortened and the bell crank 15 rotated in a counter-clockwise direction to move the finger 17 away from the flange 17'. The flange 17' and stem 2 follow the finger 17 upward under action of the spring 5, moving the pilot valve to a position to supply operating fluid to the gate motor to open the gate. The opening movement of the gate will be relayed through the crank arm 13 and link 21 to the bell crank 15 and return the pilot valve to neutral position. The increased speed of the turbine will be maintained in the new gate position by the turbine fly balls in the usual manner. Rotation of the motor 25 in a reverse direction will, of course, lengthen the effective length of the link 21 and reverse of the above action will take place to close the turbine gate and reduce the speed of the turbine.

As will hereafter be explained more fully, a single switch, such as the switch 34 and actuator 37 are used on the governor limit link of the first and last machines in the multi-generator line. On the intermediate machine or machines a double switch and actuator arrangement is required. Such an arrangement is illustrated in Figure 7 where a pair of similar switches 34A and 34B are arranged back to back in a bracket 43 secured to the tube 18 in the manner above described. A pair of switch actuators 37A and 37B are adjustably affixed to the rod 29 on opposite sides of the bracket to respectively and alternately actuate the switches 34A and 34B at predetermined limits of extension and contraction of the link 21.

Figure 1:
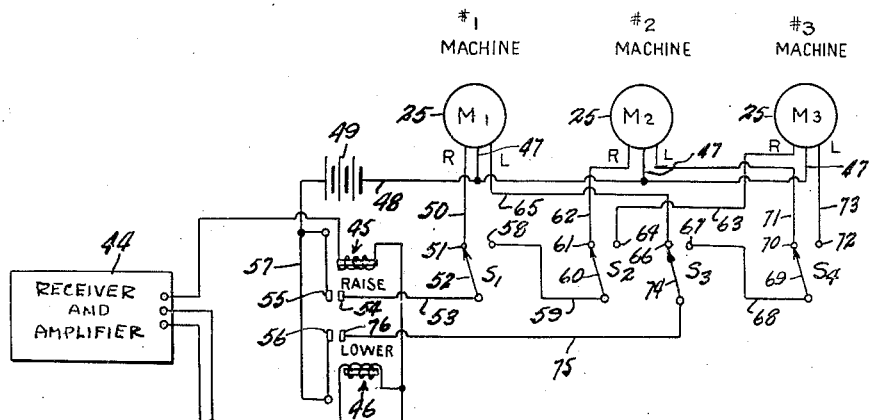
Figure 1 is a diagram showing an electrical hook-up according to this invention for automatically transferring control from one to another of the machines in a three-generator power plant.

Referring now to Figure 1, there is shown, by way of example, a hook-up for controlling a typical three-generator power plant in a tie line system in response to "raise-lower" signals or impulses sent out from a central point or dispatcher's station in the system. The signals or impulses to "raise" or "lower," i. e. increase or decrease, the power output of the plant, may be sent out at radio frequencies, either as radio waves or over the transmission lines themselves, as is well known in the art. Different frequencies are usually employed for the "raise" and "lower" signals which are received by means of suitable apparatus, such as designated diagrammatically by the receiver 44 which is adjusted to respond to these frequencies. The current is amplified and employed to close respectively a pair of relays 45 and 46 depending upon the frequency of the signal received.

In Figure 1 the designations $M_1$, $M_2$ and $M_3$ for clarity are employed to represent respectively the governor control motors 25 for the No. 1, No. 2 and No. 3 machines in the power plant while $S_1$ represents the switch 33 on the No. 1 machine, $S_2$ and $S_3$ represent respectively switches 33A and 33B on the No. 2 or intermediate machine, and $S_4$ represents the switch 33 on the No. 3 or last machine in the line. These motors are preferably three wire reversing motors and have their center wires 47 connected by a common lead 48 to a source of low potential current, such as represented by the battery 49.

Considering the motors to operate in a forward direction for a "raise" signal to increase turbine speed, and a reverse direction for a "lower" signal to reduce turbine speed, the wire 50 supplying forward rotation of motor $M_1$, is connected to one contact point 51 of switch $S_1$ while the switch contact arm 52 is connected by a lead 53 to one contact 54 of the "raise" relay 45. The coacting contact 55 of this relay is connected to a return lead 57, common to a similar contact point 56 of the "lower" relay 46, to the battery 49.

The opposite contact 58 of the switch $S_1$ is connected through a lead 59 with the switch arm 60 of switch $S_2$, one contact 61 of which is connected to the "forward" wire 62 of motor $M_2$. The "forward" wire 63 of the motor $M_3$ is connected to the other contact 64 of switch $S_2$. The wire 65 carrying current for reverse movement of motor $M_1$ is connected to one contact 66 of the switch $S_3$, the other contact 67 of which is connected through a lead 68 with the switch arm 69 of switch $S_4$. One contact 70 of the switch $S_4$ is connected to the "reverse" wire 71 of motor $M_2$ while the other contact 72 of switch $S_4$ is connected with the "reverse" wire 73 of motor $M_3$. The switch arm 74 of switch $S_3$ is connected through a lead 75 to the other contact 76 of the "lower" relay 46.

The above described relay system, or control transfer system, operates as follows:

Consider all machines "in the hole" or operating at minimum output capacity, or No. 1 machine operating at partial load and being built up to maximum capacity with the No. 2 and No. 3 machines operating at minimum capacity. The switches $S_1$, $S_2$, $S_3$ and $S_4$ will all be in the positions shown and only the No. 1 machine will be under automatic control by virtue of the switch positions, as will be seen. If a "raise" signal is now received, the relay 45 will close, completing a circuit from battery 49 through relay contacts 55 and 54, switch arm 52 and contact point 51, "forward" wire 50 to motor $M_1$, and thence to the battery. Motor $M_1$, thus energized, runs in a forward direction to shorten governor control link 21 of No. 1 machine and increase the speed of this machine as above set forth. Discontinuance of the signal will, of course, cause relay 45 to drop out and break the above circuit and stop motor $M_1$.

If "raise" signals are continued, motor $M_1$ continues to operate forwardly until the No. 1 machine builds up to its predetermined maximum capacity or, in other words, until the rod 29 of the governor control unit has moved rearwardly sufficiently to bring the flange 39 of the switch actuator 37 up to the switch operating arm 36 of switch $S_1$. When the actuator reaches this position, the switch operating arm 36 enters the notch 41 in the rotating cam 39 and is flipped to its opposite position whereby the switch arm 52 is snapped over from contact 51 to contact 58. This transfers the automatic "raise" control from governor control motor $M_1$ to $M_2$, by way of contact 58, lead 59, switch arm 60 and contact 61 of switch $S_2$ and the "forward" line 62 of motor $M_2$. From the above, it will be understood that the relative position of the switch actuator 37 on the rod 29 will determine the maximum output capacity of the generator, and since the actuator 37 is adjustable on the rod 29 this maximum capacity can be easily controlled.

If, before the switch $S_1$ is actuated as above, a "lower" signal is received, relay 46 will close and current will be supplied to the motor $M_1$ from the battery through contacts 56 and 76, lead 75, switch arm 74 and contact 66 of switch $S_3$ to the "reverse" wire 65 of motor $M_1$ to cause a reversed operation of this motor. This, of course, will rotate the rod 29 in a direction opposite to that described above and move the rod toward the collar 22 and increase the effective length of the control link 21. Increase in length of this link rotates the bell crank 15 in a clockwise direction, as will be seen from Figure 2, to move the stem 2 downward, thereby positioning the pilot valve to effect a closing movement of the turbine gate in the usual manner and slow the operation of the turbine.

If "raise" signals, however, are continued after switch $S_1$ is snapped over, the motor $M_2$ will be operated in a forward direction and the No. 2 machine will be built up in the manner above set forth. At the time control is transferred to No. 2 machine, this machine operates at minimum capacity and the switch operating arm 36 of switch $34B(S_3)$ is in the notch 41B of actuator 37B. Simultaneously with the start of a "raise" operation of motor $M_2$, the switch $S_3$ will be moved by the actuator so that the arm 74 will be snapped over from contact 66 to contact 67. This will transfer the "lower" control from $M_1$ to $M_2$ by way of lead 68, switch arm 69, and contact 70 of switch $S_4$ to the "reverse" wire 71 of motor $M_2$. Thus "raise" signals will operate $M_2$ in a forward or "raise" direction through contact 58 of $S_1$ and contact 61 of $S_2$, and in a reverse or "lower" direction through contact 67 of $S_3$ and contact 70 of $S_4$.

When No. 2 machine reaches its predetermined regulated capacity (controlled by the position of actuator 37A) switch $S_2$ (34A) will be snapped over by actuator 37A in the manner above set forth so that switch arm 60 will break with contact 61 and make contact with contact 64. With switch $S_2$ in this position, control is transferred from $M_2$ to $M_3$, the "raise" control being by way of contact 58 of $S_1$, contact 64 of $S_2$ to the forward or "raise" wire 63 of $M_3$. It is to be understood (though not illustrated) that the switch $S_4$ and its actuator occupy the same relative positions on the control unit of No. 3 machine that switch 34B ($S_3$) and actuator 37B occupy on control unit of No. 2 machine (see Figure 7). Therefore, if a "raise" signal is received after control is transferred from $M_2$ to $M_3$, switch $S_4$ will be snapped over immediately to break contact with point 70 and make contact with point 72 and "lower" control will be transferred from $M_2$ to $M_3$ by way of contact 67 of $S_3$ and contact 72 of $S_4$ to "reverse" wire 73 of $M_3$.

From the above, it will be seen that first the No. 1 machine only is operated under the automatic control to raise or lower until it is built up to its predetermined maximum load capacity, then automatic control is transferred from No. 1 to No. 2 machine which then may be automatically "raised" or "lowered" until it has built up to its predetermined maximum capacity when the control is transferred to No. 3 machine. When the last machine has reached its predetermined maximum capacity, the plant will, of course, be operating under full load. In lowering or reducing load, the reverse of the above takes place. No. 3 machine is first reduced to minimum capacity, the switch $S_4$ is snapped to position shown in Figure 1 shifting "lower" control to $M_2$ which, if operated in a reverse direction to "lower" No. 2 machine, immediately snaps $S_2$ to position shown and shifts "raise" control also to $M_2$. When $M_2$ reaches minimum capacity, $S_3$ is snapped back to original position and transfers "lower" control to $M_1$ which upon a "lower" signal snaps $S_1$ back to its original position.

With the described interlocked arrangement of the switches $S_1$, $S_2$, $S_3$ and $S_4$ and the arrangements provided for their actuation, it will be readily seen that each of the governor control motors $M_1$, $M_2$ or $M_3$ are under full control to either "raise" or "lower" until control is transferred from one to another of the motors and the latter motor is actually operated either to "raise" or "lower." Thus, there will be no dead spots in the control system and each of the governor controls may be permitted to "hunt" even at the limits of their operations.

It will also be seen, by virtue of the novel switch actuating mechanisms provided, that a wide range of machine capacities may be allowed and the transfer of control from one to another of the machines, and change of control from "raise" to "lower" operation and vice versa, may be effected within extremely close limits.

It has been found by actual operation that by means of the control transfer system herein provided that the power plant may be operated at high efficiencies and bring about thereby substantial savings in operation.

I claim:

1. In a control system for electric power plants having a plurality of current generating machines adapted to supply a common power circuit, adjusting means including an electric motor for operating the same associated with each machine for adjusting the load carried thereby, an electric circuit for the motors, regulating means responsive to load requirements for the power circuit and including the circuit for the motors for controlling the same, switching means for transferring sequentially the control of the regulating means from one to another of said motors, and actuating means associated with each motor and operated thereby at a predetermined load limit adjusted by the motor for actuating said switching means to effect control transfer.

2. In a control system for electric power plants having a plurality of electric generating machines associated with each machine mechanism for regulating the load to be carried thereby, said mechanism including a first and second relatively adjustable element, an adjusting member carried by the first element for movement relative thereto, an electric motor for moving said adjusting member, switch means carried by each first element, switch actuating means carried by each adjusting member and adapted to actuate the switch means upon movement of the adjusting member to a position corresponding to predetermined load carrying capacities for the machine being regulated thereby, an electric circuit for the motor having circuit closing means for controlling the operation of the motor, said circuit including the switch means arranged therein so that when switch means are actuated by the actuators associated therewith upon adjustment of the regulating mechanisms to said load carrying capacities the control effect of said circuit closing means will be sequentially transferred from one to another of said motors.

3. In a control system for electric power plants having a plurality of electric generating machines associated with each machine mechanism for regulating the load to be carried thereby, said mechanism including a first and second relatively adjustable element, an adjusting member carried by the first element for movement relative thereto and an electric motor for moving said adjusting member, switch means carried by each first element, switch actuating means carried by each adjusting member and adapted to actuate the switch means upon movement of the adjusting member to a position corresponding to predetermined load carrying capacities for the machine being regulated thereby, an electric circuit for the motor having circuit closing means for controlling the operation of the motor, said circuit including the switch means arranged therein so that when switch means are actuated by the actuators associated therewith upon adjustment of the regulating mechanisms to said load carrying capacities the control effect of said circuit closing means will be sequentially transferred from one to another of said motors, and means for adjusting each actuator with respect to the adjusting member carrying the same for predetermining the load carrying capacities of the machines at which said transfer is effected.

4. In a control system for electric power plants having a plurality of electric generators, each driven by a governor controlled prime mover, each prime mover having means including a pair of relatively movable members for adjusting the speed control effect of the governor thereof, link means respectively connecting said members of the prime movers, each link means including a first elongated element and a second elongated element capable of relative movement with respect thereto, rod means carried by the first element for longitudinal adjustment with respect thereto, abutment means carried by the second element for engaging the rod means to determine the effective length of said link and thereby the relative positions of said members, means including an electric motor for adjusting said rod, switch means having a pair of alternately closeable contact means carried by the first element, said switch means having an operating arm, actuating means carried by the rod and adapted to move the arm upon a predetermined limit of adjustment thereof to open one contact means and close the other, an electric circuit including circuit closing means for the motor to control the operation thereof, said circuit including said contacts arranged therein to transfer control from one motor to another upon movement of said arm by said actuator.

5. In a control system for electric power plants having electric generating means driven by a governor controlled mechanism, said mechanism having means including a pair of relatively movable members for adjusting the speed control of the governor thereof, link means connecting said members and including a first elongated element and a second elongated element capable of relative longitudinal movement with respect thereto, rod means carried by the first element for longitudinal adjustment with respect thereto, abutment means carried by the second element for engaging the rod means to determine the effective length of said link and thereby the relative positions of said members, means including an electric motor for adjusting the rod means with respect to the first element, an electric circuit for energizing the motor, switch means carried by the first element and forming a part of said circuit, switch actuating means carried by the rod means for movement therewith, said actuating means adapted to engage and actuate said switch means at a predetermined effective length of said link.

6. In a control system for electric power plants having electric generating means driven by a governor controlled mechanism, said mechanism having means including a pair of relatively movable members for adjusting the speed control of the governor thereof, link means connecting said members and including a first elongated element and a second elongated element capable of relative longitudinal movement with respect thereto, nut means rigidly supported by the first element, a threaded rod disposed parallel to the first element and having a threaded engagement with said nut means, abutment means carried by the second element for engaging said rod to determine the effective length of said link and thereby the relative positions of said members, means including an electric motor having an operative connection with the rod to rotate the same in said nut, an electric circuit for energizing the motor, switch means carried by the first element and forming a part of said circuit, an operating arm for the switch means, a circular disc member having a peripheral notch carried by the rod means for movement therewith, said notch adapted to engage and move said arm to actuate the switch means at a predetermined effective length of said link.

7. In a control system for electric power plants having electric generating means driven by a governor controlled mechanism, said mechanism having means including a pair of relatively movable members for adjusting the speed control of the governor thereof, link means connecting said members and including a first elongated element and a second elongated element capable of relative longitudinal movement with respect thereto, rod means carried by the first element for longitudinal adjustment with respect thereto, abutment means carried by the second element for engaging the rod means to determine the effective length of said link and thereby the relative positions of said members, means including an electric motor for adjusting the rod means with respect to the first element, an electric circuit for energizing the motor, switch means carried by the first element and forming a part of said circuit, switch actuating means carried by the rod means for movement therewith and adapted to engage and actuate said switch means at a predetermined effective length of said link, and means for adjusting the actuating means longitudinally with respect to said rod.

8. In a control system for electric power plants having electric generating means driven by a governor controlled mechanism, said mechanism having means including a pair of relatively movable members for adjusting the speed control of the governor thereof, link means connecting said members and including a first elongated element and a second elongated element capable of relative longitudinal movement with respect thereto, nut means rigidly supported by the first element, a threaded rod disposed parallel to the first element and having a threaded engagement with said nut means, abutment means carried by the second element for engaging said rod to determine the effective length of said link and thereby the relative positions of said members, means including an electric motor having an operative connection with the rod to rotate the same in said nut, an electric circuit for energizing the motor, switch means carried by the first element and forming a part of said circuit, an operating arm for the switch means, a circular disc member having a peripheral notch carried by the rod means for movement therewith, said disc member having a screw threaded engagement with the second element for longitudinal adjustment with respect thereto, said notch being adapted to engage and move said arm to actuate the switch means at a predetermined length of said link.

9. A method of operating an electric power plant having a plurality of electric generating machines, each machine being capable of adjustment to carry a varying load ranging between a predetermined minimum and maximum capacity for the machine, comprising controlling the adjustment of a first machine in either of two opposed directions respectively to increase or decrease the load carried thereby until said machine reaches either of said capacities, then transferring the control to a succeeding machine to adjust the latter in the direction of adjustment of the first machine at the time of said transfer while maintaining the control of adjustment of the first machine in the opposite direction, and transferring the control of adjustment in said opposite direction to the succeeding machine after the latter has been adjusted in the first named direction.

JAMES W. PEEPLES.

REFERENCES CITED

The following references are of record in the file of this patent:

UNITED STATES PATENTS

| Number | Name | Date |
|---|---|---|
| 1,740,078 | Earle | Dec. 17, 1929 |
| 1,761,797 | Pfau | June 3, 1930 |
| 1,763,616 | Kane | June 10, 1930 |
| 1,907,517 | DeCamp | May 9, 1933 |
| 1,920,544 | Ashbaugh et al. | Aug. 1, 1933 |
| 1,984,187 | Hayward et al. | Dec. 11, 1934 |
| 1,984,940 | Plechl | Dec. 18, 1934 |
| 1,989,481 | Kerr | Jan. 29, 1935 |
| 2,010,594 | Kerr | Aug. 6, 1935 |
| 2,015,555 | Fountain | Sept. 24, 1935 |
| 2,050,338 | Kerr | Aug. 11, 1936 |
| 2,098,654 | Carter | Nov. 9, 1937 |
| 2,366,968 | Kaufmann | Jan. 9, 1945 |